US008147096B2

(12) United States Patent
Zhong

(10) Patent No.: US 8,147,096 B2
(45) Date of Patent: Apr. 3, 2012

(54) LIGHTING FIXTURE ZOOM DEVICE, AND LIGHTING FIXTURE COMPRISING SAID ZOOM DEVICE

(75) Inventor: Yi Zhong, Guangdong (CN)

(73) Assignee: Clay Paky S.p.A., Seriate (IT)

( * ) Notice: Subject to any disclaimer, the term of this patent is extended or adjusted under 35 U.S.C. 154(b) by 187 days.

(21) Appl. No.: 12/783,772

(22) Filed: May 20, 2010

(65) Prior Publication Data

US 2010/0321940 A1 Dec. 23, 2010

(30) Foreign Application Priority Data

May 22, 2009 (IT) .............................. MI2009A0914

(51) Int. Cl.
*G02B 15/14* (2006.01)

(52) U.S. Cl. ......... 362/268; 359/690; 359/784; 359/738

(58) Field of Classification Search .................. 362/268; 359/683–685, 689, 690, 723, 738, 784, 785, 359/800

See application file for complete search history.

(56) References Cited

U.S. PATENT DOCUMENTS

| | | | | |
|---|---|---|---|---|
| 4,153,337 | A | 5/1979 | Guyen | |
| 5,600,490 | A | 2/1997 | Sugawara et al. | |
| 6,028,717 | A | 2/2000 | Kohno et al. | |
| 2002/0005994 | A1 * | 1/2002 | Shikama | 359/749 |
| 2009/0219624 | A1 * | 9/2009 | Yamamoto et al. | 359/684 |

FOREIGN PATENT DOCUMENTS

| | | |
|---|---|---|
| EP | 0352754 | 1/1990 |
| WO | WO 99/18467 | 4/1999 |

* cited by examiner

*Primary Examiner* — Evan Dzierzynski
(74) *Attorney, Agent, or Firm* — Leason Ellis LLP

(57) ABSTRACT

A zoom device for a lighting fixture has a first lens assembly of positive refractive power; a second lens assembly of negative refractive power; and a third lens assembly of positive refractive power.

The first lens assembly, second lens assembly, and third lens assembly are aligned along a longitudinal axis coincident with the axis of a light beam emitted by a light source of the lighting fixture, and are characterized by respective focal lengths, which are such as to effectively adjust the size of the images projected by the lighting fixture, while at the same time maintaining compactness of the zoom device.

10 Claims, 2 Drawing Sheets

LIGHTING FIXTURE ZOOM DEVICE, AND LIGHTING FIXTURE COMPRISING SAID ZOOM DEVICE

The present invention relates to a stage lighting fixture zoom device, and to a stage lighting fixture comprising said zoom device.

BACKGROUND OF THE INVENTION

Known stage lighting fixtures comprise a main body extending along a longitudinal axis; a light source housed inside the closed end of the main body to emit a light beam substantially along the axis; and light beam filtering and/or modelling means positioned to intercept the light beam.

The light beam filtering and/or modelling means are designed to produce special beam effects, and normally comprise light beam colouring assemblies; gobos; and a zoom device for adjusting the size of the image projected by the lighting fixture.

The ever increasing need to reduce the size of stage lighting fixtures makes it necessary to minimize the size of the light beam filtering and/or modelling means and, therefore, also the zoom device.

Known compact zoom devices, however, are invariably deficient in terms of quality and efficiency.

SUMMARY OF THE INVENTION

It is an object of the present invention to provide a zoom device designed to eliminate the above drawbacks of the known art, and which, in particular, is compact and efficient.

According to the present invention, there is provided a zoom device as claimed in the attached Claims.

Another object of the invention is to provide a lighting fixture that is compact and provides for efficiently adjusting the size of the projected image.

According to the present invention, there is provided a lighting fixture as claimed in the attached Claims.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
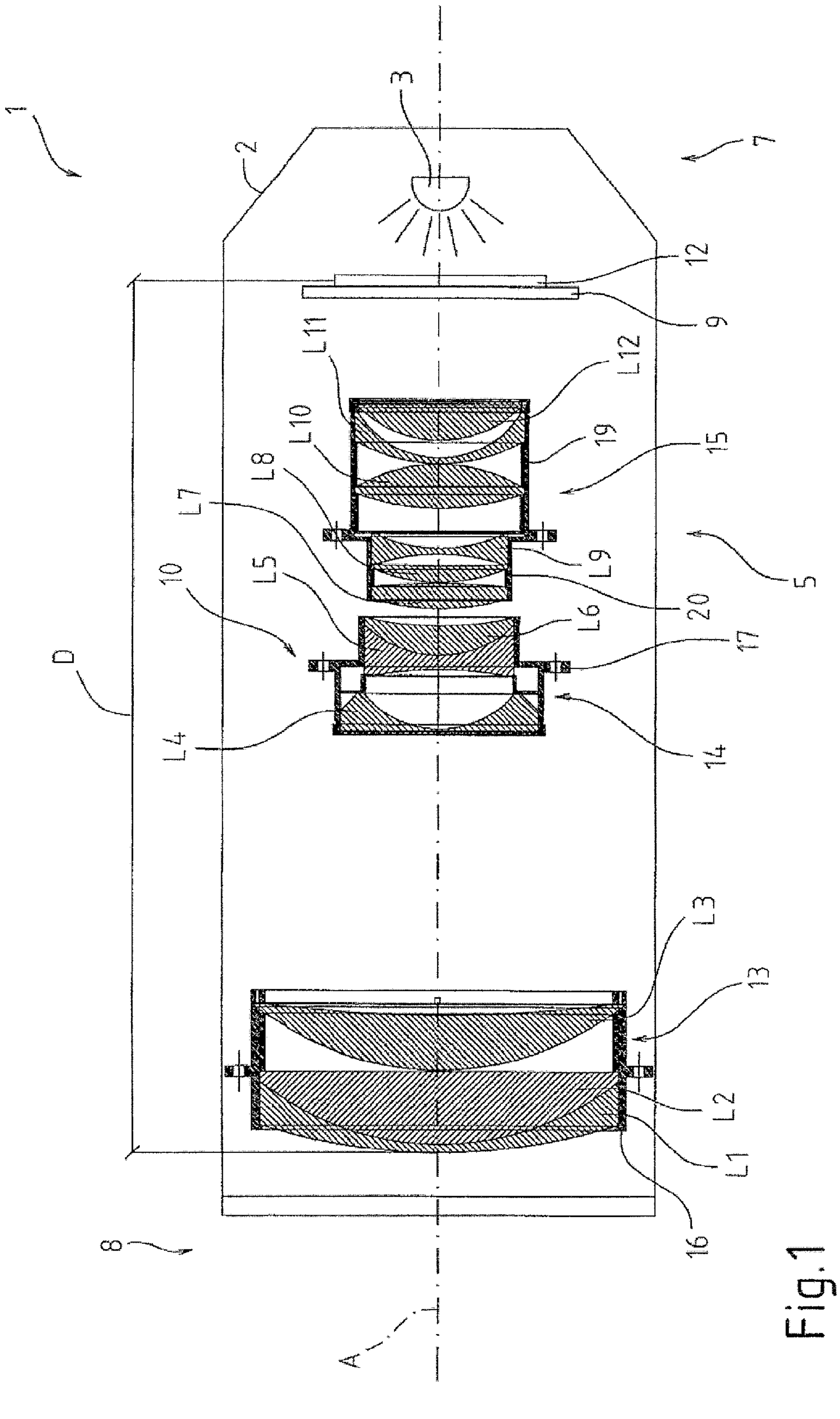
FIG. 1 shows a schematic, partly sectioned view, with parts removed for clarity, of a lighting fixture in accordance with the present invention.

Number 1 in FIG. 1 indicates a stage lighting fixture comprising a main body 2, a light source 3, and light beam filtering and/or modelling means 5.

Main body 2 extends along a longitudinal axis A, and has a first end 7, and a second end 8 opposite to the first end 7 along axis A.

Light source 3 is housed inside first end 7 of main body 2, and is designed to emit a light beam substantially along axis A.

Light beam filtering and/or modelling means 5 comprise a carriage 9, fitted with one or more elements to be projected, and a zoom device 10 in turn comprising a first lens assembly 13, a second lens assembly 14, and a third lens assembly 15.

More specifically, the elements to be projected fitted to carriage 9 may be a gobo assembly, a slide, a distorting glass, etc. In the non-limiting example described and illustrated, carriage 9 is fitted with a gobo assembly 12 comprising a gobo disk and a plurality of gobos (not shown for the sake of simplicity in annexed figures), which are disks typically made of stainless steel or glass, in which a pattern or shape is formed or drawn to produce a light pattern when the gobo intercepts the light beam.

Carriage 9 is movable along axis A, and is positioned so that the distance D between the element to be projected (in the example shown, a gobo of gobo assembly 12) and the last lens in first lens assembly 13 to intercept the light beam is constant. In the non-limiting example described and illustrated, distance D is roughly 295 mm.

First lens assembly 13 is located close to second end 8 of main body 2, and is of positive refractive power.

The refractive power of an optical element is the extent to which light travelling through the optical element changes direction. When refractive power is positive, the light issuing from the optical element converges; and when refractive power is negative, the light issuing from the optical element diverges.

First lens assembly 13 comprises a convex-concave lens L1, a planoconvex lens L2, a convex-concave lens L3, and a frame 16 supporting lenses L1, L2, L3. Lenses L1 and L2 are joined, whereas lenses L2 and L3 are spaced apart, preferably by a distance of 0.5 mm.

More specifically, lenses L1, L2, L3 in first lens assembly 13 have the characteristics indicated in the Table below, in which lens "face a" and lens "face b" are intended to mean the light beam exit and entry face of the lens respectively.

| LENS | RADIUS OF CURVATURE (mm) | THICKNESS (mm) | DIAMETER (mm) |
|---|---|---|---|
| L1 face a | 215.227 | 3 | 130 |
| L1 face b | 105.768 | | 130 |
| L2 face a | 105.768 | 26 | 130 |
| L2 face b | infinite | | 130 |
| L3 face a | 107.925 | 19.80 | 130 |
| L3 face b | 500.781 | | 130 |

In the example described and illustrated, first lens assembly 13 is fixed.

In a variation not shown of the present invention, frame 16 is fitted to a powered carriage movable along axis A to adjust the position of first lens assembly 13 with respect to the element to be projected fitted to carriage 9, so that the distance D between the element to be projected and lens L1 in first lens assembly 13 is constant.

The diameter of lenses L1, L2, L3 in first lens assembly 13 is preferably greater than or equal to the diagonal of the element to be projected (the gobo, in the example shown).

Second lens assembly 14 is located between first lens assembly 13 and third lens assembly 15 along axis A, is of negative refractive power, and is movable along axis A. More specifically, second lens assembly 14 is movable between a first so-called wide-angle operating position, and a second so-called narrow-angle or telephoto operating position.

Figure 2:
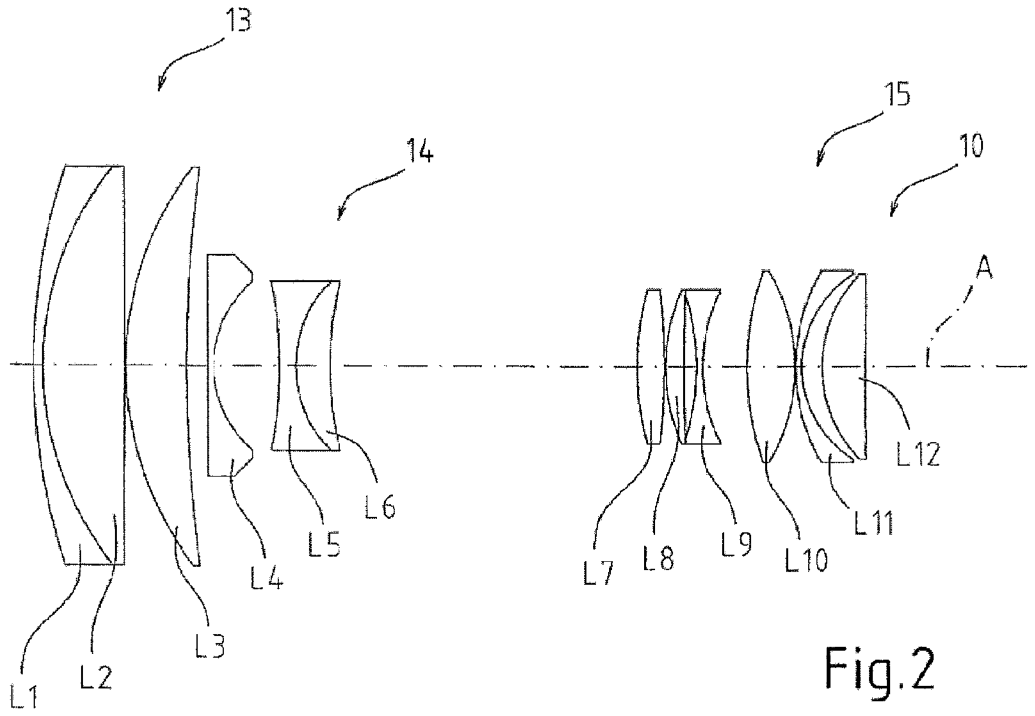
FIG. 2 shows a schematic view, with parts removed for clarity, of the zoom device according to the present invention in a first operating position.

FIG. 2 shows zoom device 10 with second lens assembly 14 in the first wide-angle position, in which second lens assembly 14 is positioned close to first lens assembly 13, and the image projected by lighting fixture 1 is enlarged.

Figure 3:
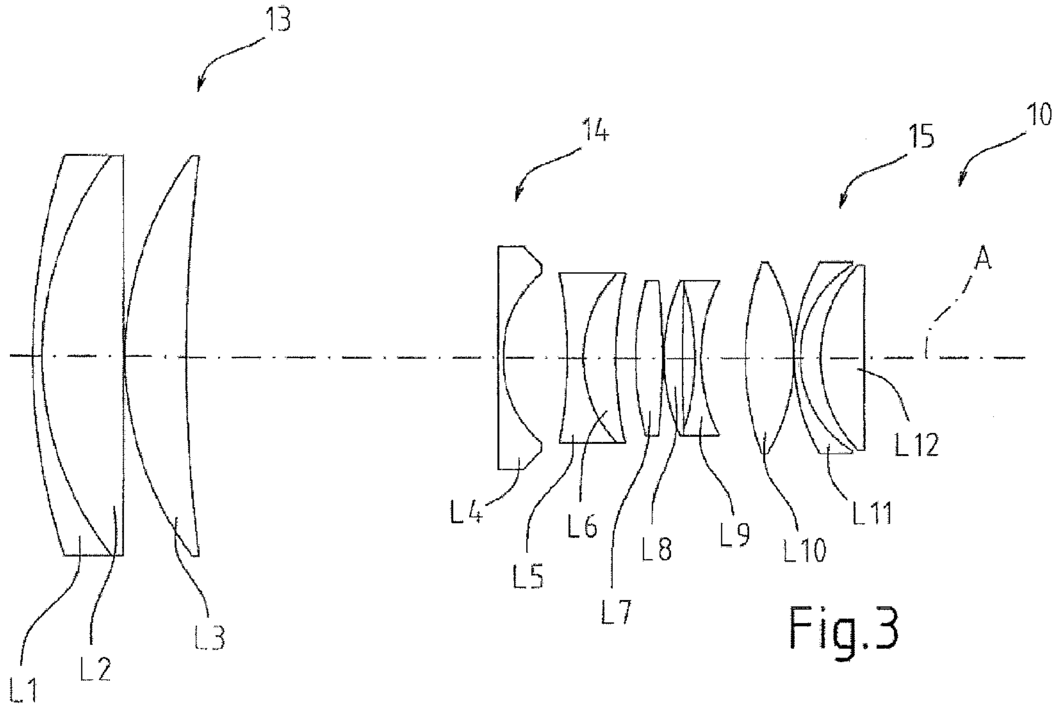
FIG. 3 shows a schematic view, with parts removed for clarity, of the zoom device according to the present invention in a second operating position.

FIG. 3 shows zoom device 10 with second lens assembly 14 in the second narrow-angle position, in which second lens assembly 14 is positioned close to third lens assembly 15, and the image projected by lighting fixture 1 is made smaller.

With reference to FIG. 1, second lens assembly 14 comprises a planoconcave lens L4, a double-concave lens L5, a negative meniscus lens L6, and a frame 17 supporting lenses L4, L5, L6. Lenses L5 and L6 are joined, whereas lenses L4 and L5 are spaced apart, preferably by a distance of 21.46 mm.

Frame 17 is preferably fitted to a powered carriage (not shown for the sake of simplicity), the movement of which is controlled by a control device (not shown).

More specifically, lenses L4, L5, L6 in second lens assembly 14 have the characteristics indicated in the Table below, in which lens "face a" and lens "face b" are intended to mean the light beam exit and entry face of the lens respectively.

| LENS | RADIUS OF CURVATURE (mm) | THICKNESS (mm) | DIAMETER (mm) |
|---|---|---|---|
| L4 face a | 2558.978 | 2.00 | 72 |
| L4 face b | 35.984 | | 55 |
| L5 face a | −143.637 | 5.23 | 55 |
| L5 face b | 39.087 | | 55 |
| L6 face a | 39.087 | 10.84 | 55 |
| L6 face b | 121.650 | | 55 |

Third lens assembly 15 is located between second lens assembly 14 and carriage 9, is of positive refractive power, and is movable along axis A to adjust the focus of the projected image.

Third lens assembly 15 comprises a double-convex lens L7, a negative meniscus lens L8, a double-concave lens L9, a double-convex lens L10, a negative meniscus lens L11, a planoconvex lens L12, and a frame 19 supporting lenses L7, L8, L9, L10, L11, L12.

Lenses L7, L8, L9, L10, L11 and L12 are spaced apart, preferably by a distance of 0.2 mm between lenses L7 and L8, 4.13 mm between lenses L8 and L9, 14.42 mm between lenses L9 and L10, 0.2 mm between lenses L10 and L11, and 6.49 mm between lenses L11 and L12.

Frame 19 is preferably fitted to a powered carriage (not shown for the sake of simplicity), the movement of which is controlled by a control device (not shown).

More specifically, lenses L7, L8, L9, L10, L11, L12 in third lens assembly 15 have the characteristics indicated in the Table below, in which lens "face a" and lens "face b" are intended to mean the light beam exit and entry face of the lens respectively.

| LENS | RADIUS OF CURVATURE (mm) | THICKNESS (mm) | DIAMETER (mm) |
|---|---|---|---|
| L7 face a | 93.321 | 9.00 | 50 |
| L7 face b | −225.250 | | 50 |
| L8 face a | 62.487 | 6.01 | 50 |
| L8 face b | 673.000 | | 50 |
| L9 face a | −75.264 | 2.00 | 46.40 |
| L9 face b | 55.468 | | 50 |

-continued

| LENS | RADIUS OF CURVATURE (mm) | THICKNESS (mm) | DIAMETER (mm) |
|---|---|---|---|
| L10 face a | 93.321 | 15.71 | 62 |
| L10 face b | −60.582 | | 62 |
| L11 face a | 62.847 | 2.00 | 62 |
| L11 face b | 35.294 | | 60 |
| L12 face a | 42.500 | 14.25 | 60 |
| L12 face b | 2730.510 | | 60 |

Third lens assembly 15 preferably comprises a light beam reducing ring 20 for eliminating the aberration effect produced by the light beam travelling through the lenses of zoom device 10. Ring 20 is preferably located between lenses L7 and L8, and is smaller in diameter than lens L8 which intercepts the light beam before ring 20.

In the non-limiting example described and shown, ring 20 is roughly 44 mm in diameter.

Zoom device 10 as described satisfies the following conditions:

$$2.12 < \frac{F_1}{F_m} < 2.80$$

$$-0.55 < \frac{F_2}{F_m} < -0.81$$

$$0.6 < \frac{F_3}{F_m} < 0.84$$

$$F_m = (F_s \cdot F_l)^{0,5}$$

where:

$F_s$ is the focal length of zoom device 10 when second lens assembly 14 is in the wide-angle position;

$F_1$ is the focal length of zoom device 10 when second lens assembly 14 is in the narrow-angle position;

$F_1$ is the focal length of first lens assembly 13;

$F_2$ is the focal length of second lens assembly 14;

$F_3$ is the focal length of third lens assembly 15.

Zoom device 10 as described provides for a so-called zoom ratio of 9:1, with a light beam exit angle ranging between roughly 6.5° and 60°.

With the zoom device 10 according to the present invention, lighting fixture 1 can be used both as a diffused-light lighting fixture, also called washlight, and as a sharp-light lighting fixture, also called spotlight.

Clearly, changes may be made to lighting fixture 1 and zoom device 10 as described herein without, however, departing from the scope of the accompanying Claims.

The invention claimed is:

1. A zoom device for a lighting fixture, comprising:

a first lens assembly (13) of positive refractive power;

a second lens assembly (14) of negative refractive power; and a third lens assembly (15) of positive refractive power;

the first lens assembly (13), second lens assembly (14), and third lens assembly (15) being aligned along a longitudinal axis (A) coincident with the axis of a light beam emitted by a light source (3) of the lighting fixture (1); the third lens assembly (15) being located close to the light source (3) of the lighting fixture (1), and the second lens assembly (14) being located between the first lens assembly (13) and the third lens assembly (15);

the zoom device (10) being characterized by satisfying the following conditions:

$$2.12 < \frac{F_1}{F_m} < 2.80$$

$$-0.55 < \frac{F_2}{F_m} < -0.81$$

$$0.6 < \frac{F_3}{F_m} < 0.84$$

$$F_m = (F_s \cdot F_l)^{0,5}$$

where:

$F_s$ is the focal length of the zoom device (10) when the second lens assembly (14) is in a wide-angle position;

$F_1$ is the focal length of the zoom device (10) when the second lens assembly (14) is in a narrow-angle position;

$F_1$ is the focal length of the first lens assembly (13);

$F_2$ is the focal length of the second lens assembly (14);

$F_3$ is the focal length of the third lens assembly (15).

2. A device as claimed in claim 1, wherein the second lens assembly (14) is movable along the axis (A) to adjust the enlargement of an image projected by the lighting fixture (1).

3. A device as claimed in claim 1, wherein the third lens assembly (15) is movable along the axis (A) to adjust the focus of an image projected by the lighting fixture (1).

4. A device as claimed in claim 1, wherein the first lens assembly (13) is movable along the axis (A) to adjust the distance (D) between the first lens assembly (13) and an element to be projected of the lighting fixture (1) located between the light source (3) and the third lens assembly (15).

5. A device as claimed in claim 1, wherein the first lens assembly (13) comprises three lenses (L1, L2, L3); the second lens assembly (14) comprises three lenses (L4, L5, L6); and the third lens assembly (15) comprises six lenses (L7, L8, L9, L10, L11, L12).

6. A device as claimed in claim 1, wherein the third lens assembly (15) comprises a light beam reducing ring (20).

7. A device as claimed in claim 6, wherein the light beam reducing ring (20) is circular, and is smaller in diameter than a lens forming part of the third lens assembly (15) and which intercepts the light beam before the light beam reducing ring (20).

8. A stage lighting fixture comprising a main body (2); a light source (3) for emitting a light beam substantially along a longitudinal axis (A); and light beam filtering and/or modelling means (5); the lighting fixture (1) being characterized in that the light beam filtering and/or modelling means (5) comprise a zoom device (10) as claimed in claim 1.

9. A lighting fixture as claimed in claim 8, wherein the light beam filtering and/or modelling means (5) comprise at least one element to be projected, located between the light source (3) and the zoom device (10).

10. A lighting fixture as claimed in claim 9, wherein the distance (D) between the first lens assembly (13) and the element to be projected is constant.

* * * * *